R. M. ROSS.
Assignor to THE S. S. WHITE DENTAL MANUFACTURING COMPANY.
DENTAL DRILL HAND PIECE.
No. 10,423. Reissued Dec. 11, 1883.
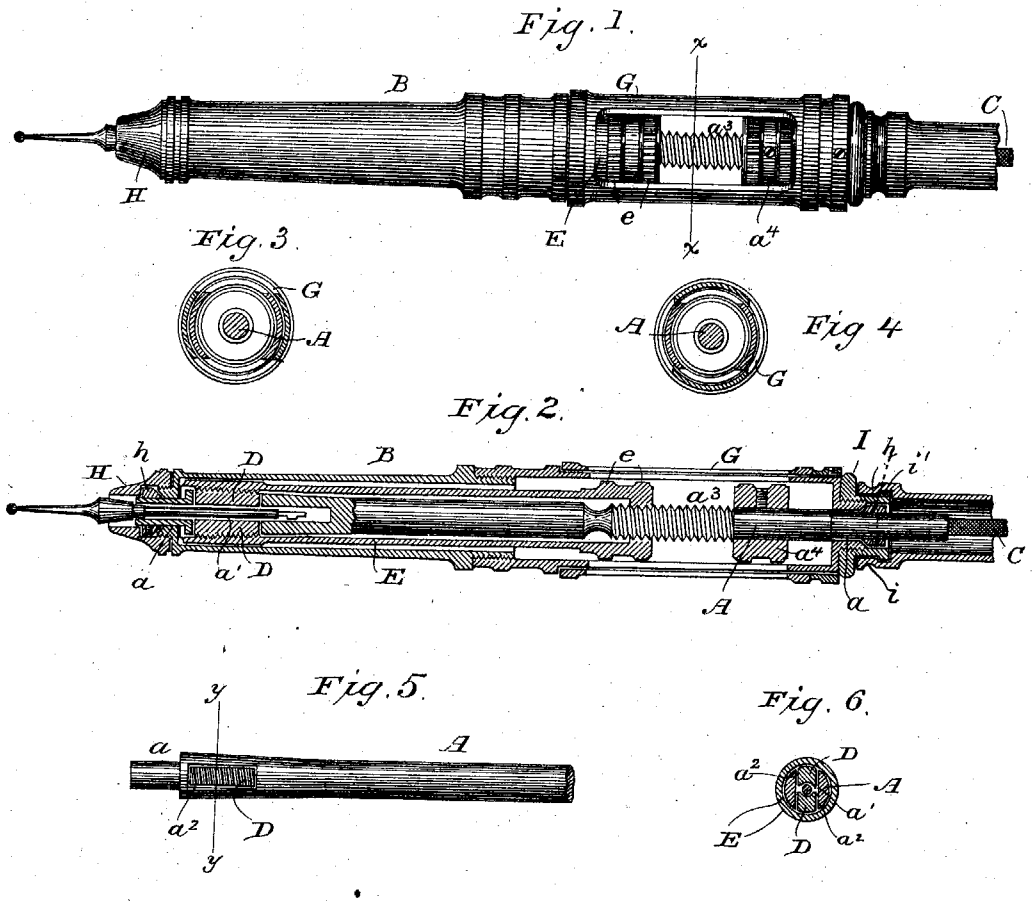
WITNESSES:
Wm. A. Skinkle,
Jos. S. Palmer
INVENTOR:
Robert M. Ross,
By his Attorneys
Baldwin, Hopkins & Peyton.
N. PETERS, Photo-Lithographer, Washington, D. C.

UNITED STATES PATENT OFFICE.

ROBERT M. ROSS, OF UTICA, NEW YORK, ASSIGNOR TO THE S. S. WHITE DENTAL MANUFACTURING COMPANY, OF PHILADELPHIA, PA.

DENTAL-DRILL HAND-PIECE.

SPECIFICATION forming part of Reissued Letters Patent No. 10,423, dated December 11, 1883.

Original No. 281,139, dated July 10, 1883. Application for reissue filed September 25, 1883.

*To all whom it may concern:*

Be it known that I, ROBERT M. ROSS, of Utica, in the county of Oneida and State of New York, have invented a new and Improved Hand-Piece for Dental Drills, of which the following is a specification.

My invention relates to improvements in dental-engine hand-pieces, and has for its special object to adapt the hand-piece to receive and hold tools having smooth shanks and tools having shanks of slightly-different sizes, in such a way that the tool-shank will be firmly grasped and solidly and securely locked in the rotary spindle of the hand-piece when in operation, so that the tool will be steadily driven without wabbling or loose movement in said spindle.

The subject-matter claimed is particularly pointed out at the close of the specification.

In the accompanying drawings, Figure 1 is a view in elevation of my improved hand-piece. Fig. 2 is a longitudinal section through the same. Figs. 3 and 4 are transverse sections therethrough on the lines *x x* of Fig. 1, showing the shell or cover, hereinafter described, in different positions. Fig. 5 is a view in elevation of the front end of the rotary spindle, showing more particularly the tool clamp-blocks fitted in and carried by said spindle. Fig. 6 is a transverse section through said front end of the spindle at the point where it is provided with the clamp-blocks, a clamping-sleeve which operates said blocks being also shown.

The tool-holder or spindle A is mounted in the hand-piece casing B, which is fitted with bearings to receive the journals *a a* of said spindle, so that the spindle is free to revolve on its longitudinal axis in said casing to drive an operating-tool. The rear end of the rotary spindle is connected with a power-conveyer, C, by which the spindle is driven, as usual. The front end of said spindle is longitudinally socketed, as at $a'$, as usual, for the reception of the shanks of the operating-tools.

In order to lock the tool-shank firmly and solidly in the spindle-socket $a'$, I have fitted clamp-blocks D D in lateral openings or slots $a^2$ $a^2$ in the spindle, which openings communicate with or intersect said longitudinal socket $a'$. These clamp-blocks are loosely fitted in the spindle at opposite sides thereof, so as to be capable of moving laterally only—or, in other words, back and forth in a right line relatively to the longitudinal tool-receiving socket. Said blocks extend lengthwise of the spindle, so that their inner clamping-surfaces are of considerable extent; and, inasmuch as the tool-shank is clamped between the loosely-fitted blocks, it will be obvious that a broad bearing is had by the blocks upon the tool-shank inserted between them when said blocks are forced inwardly, whereby the tool will be solidly, evenly, and firmly grasped and locked in the spindle. The inner or clamping surfaces of the blocks D D are preferably hollowed out or grooved, so as to fit the round or cylindrical shank of the tool inserted between them. (See Fig. 6.)

In order to compress or force the clamp-blocks inwardly, or toward each other, so as to grasp the tool-shank which may be inserted in the tool-socket between said blocks, an endwise-movable sleeve, E, is mounted on and revolves with the spindle, the rear end of said sleeve being internally threaded to receive the external threads, $a^3$, formed on the spindle at about its center or within the casing. The front end of said sleeve E is internally threaded, and is fitted to work upon and over the outer surfaces or sides of the clamp-blocks D D, which surfaces are also correspondingly threaded or ribbed to receive the threads of said sleeve, whereby the clamping-power is centered at the forward end of the sleeve, and not at the rear end, which is threaded to fit the threaded spindle, for the purpose, mainly, of being nicely guided thereon. When said sleeve is moved forward the clamp-blocks are compressed or forced inwardly upon the tool-shank to clamp it, and when the sleeve is retracted the blocks are loosened or released.

To facilitate this compression and the operation of the blocks, the mouth of the sleeve is slightly flared, the front end of the spindle is correspondingly tapered, and the clamp-blocks are made slightly tapered or wedge shape. By turning the sleeve E upon the spindle it is moved forward or back, and the clamp-block compressed or released, as the case may be.

To afford ready access to the rear end of the clamping-sleeve E through the casing B, said casing is slotted on opposite sides to admit the application of the fingers to turn the sleeve on the spindle by means of a milled surface, *e*, on said sleeve.

It will be obvious that as the sleeve is turned upon the spindle A it will be moved longitudinally thereon and the front end of the sleeve forced in engagement with the clamp-blocks or withdrawn therefrom, and said clamp-blocks, consequently, will be either forced into locking-contact with the tool-shank, or said shank will be released by the release of the blocks, as above stated.

In order to hold the spindle stationary while the clamping-sleeve above described is being manipulated, it is provided with a roughened surface or nut, $a^4$, which also acts as a stop to limit the backward movement of said clamping-sleeve. The openings in the hand-piece casing, which permit access to manipulate the tool-locking devices, may be closed by a turning thimble, G, slotted correspondingly with the case B, the rotary thimble being capable of being turned either to close the slots or openings in the casing or to expose them. The casing B is a sectional casing, to admit of the separation of the parts of the hand-piece for repair, cleansing, &c., and it incloses the tool locking and driving portions of the hand-piece, so that the operator may grasp the hand-piece in his hand in operation and direct it to the work to be done without injury from rotary parts.

To compensate for wear of the journals and bearings, adjustable conical collars *h h* are mounted on the spindle and fitted to cone-seats in the casing. Said collars also constitute the pull and thrust bearings of the spindle—that is, prevent its endwise movement in the casing when a pulling or push cut is being made with the tool.

The front end of the casing is provided with a detachable cap, H, to inclose the front journal of the spindle, while the rear end of the casing is fitted with a swiveling connection for the sheath or cover, which envelops the power-conveyer that gives motion to the spindle. This swivel-connection may be constructed by first fitting a ring, *i*, loosely on the reduced portion of a screw-nut, I, and securing it thereon with the capacity of revolving by means of a ring, *i'*, soldered to said screw-nut, the end of the cover or envelope of the power-conveyer being then soldered to the turning ring *i*, as clearly shown in the drawings.

I do not, however, claim the swivel connection, nor the cap H, nor the manner of fitting the bearings of the spindle in the casing, nor the adjustable cone-collars for compensating for wear, as these features are all old, and not of my first invention.

I am also aware that hand-pieces have been devised having a single clamp-block to operate against a tool-shank when inserted in the spindle, said block being operated by a pivoted rocking sleeve and a lever-connection; but a solid, rigid, and even lock is not by this means attained.

I am also aware that spring-jaws have been arranged opposite each other on the spindle, so as to operate through lateral openings in said spindle to grasp the tool-shank, but in that case the spring-jaws are rigidly secured at one end to the spindle, and consequently, when moving in and out, move on the arc of a circle, and present but little surface to act upon the tool-shank; and by this means, also, a solid, firm, and even lock is not attained.

By the use of the loosely-fitted and ribbed or threaded clamp-blocks, arranged to act upon the opposite sides of the tool-shank, when compressed by the threaded locking-sleeve, a broad even surface is brought to bear on the shank, and the inequalities in the shank compensated for, and the tool-shank is, consequently, solidly centered and locked in the socket of the spindle, and is rigidly and firmly driven, all loose movement being avoided. This is a highly important desideratum in hand-pieces, as the work required of them is of a very delicate nature, and the tools should be revolved with absolute steadiness.

My improved hand-piece is what is commonly known as a "chuck" hand-piece, and, consequently, is not dependent for its locking action upon any peculiar construction of the driving end or shank of the tool, but will receive tools, the shanks of which may vary slightly in size, the shanks of all tools for use in dental engines being now made cylindrical, and generally of about the same diameter.

I claim as my invention and desire to secure by Letters Patent—

The combination, substantially as hereinbefore set forth, in a dental-engine hand-piece, of the casing, the rotary socketed spindle or tool-holder fitted to turn in bearings in said casing, the threaded or ribbed clamp-blocks fitted in said spindle so as to be movable laterally only relatively to the longitudinal bore or socket thereof, and a clamping-sleeve internally threaded to fit said clamp-blocks, movable endwise on said spindle.

In testimony whereof I have hereunto set my hand, in the presence of two subscribing witnesses, this 14th day of September, A. D. 1883.

ROBERT M. ROSS.

Witnesses:
JACOB J. SIEGMAN,
E. JAY KLINCK.